R. F. MODULATION SYSTEM FOR BARRIER GRID STORAGE TUBES

Filed May 26, 1953 2 Sheets-Sheet 1

INVENTORS
DONALD R. YOUNG
RALPH B. DELANO, JR.
GERALD L. SHULTZ

BY William V. Schelberg
AGENT

R. F. MODULATION SYSTEM FOR BARRIER GRID STORAGE TUBES

Filed May 26, 1953 2 Sheets-Sheet 2

AMPLIFIER "A"

INVENTORS
DONALD R. YOUNG
RALPH B. DELANO, JR.
GERALD L. SHULTZ

BY William V. Schellberg
AGENT 2,863,090

R. F. MODULATION SYSTEM FOR BARRIER GRID STORAGE TUBES

Donald R. Young, Ralph B. De Lano, Jr., and Gerald L. Shultz, Poughkeepsie, N. Y., assignors to International Business Machines Corporation, New York, N. Y., a corporation of New York Application May 26, 1953, Serial No. 357,542

5 Claims. (Cl. 315—12)

Figures 1, 2:
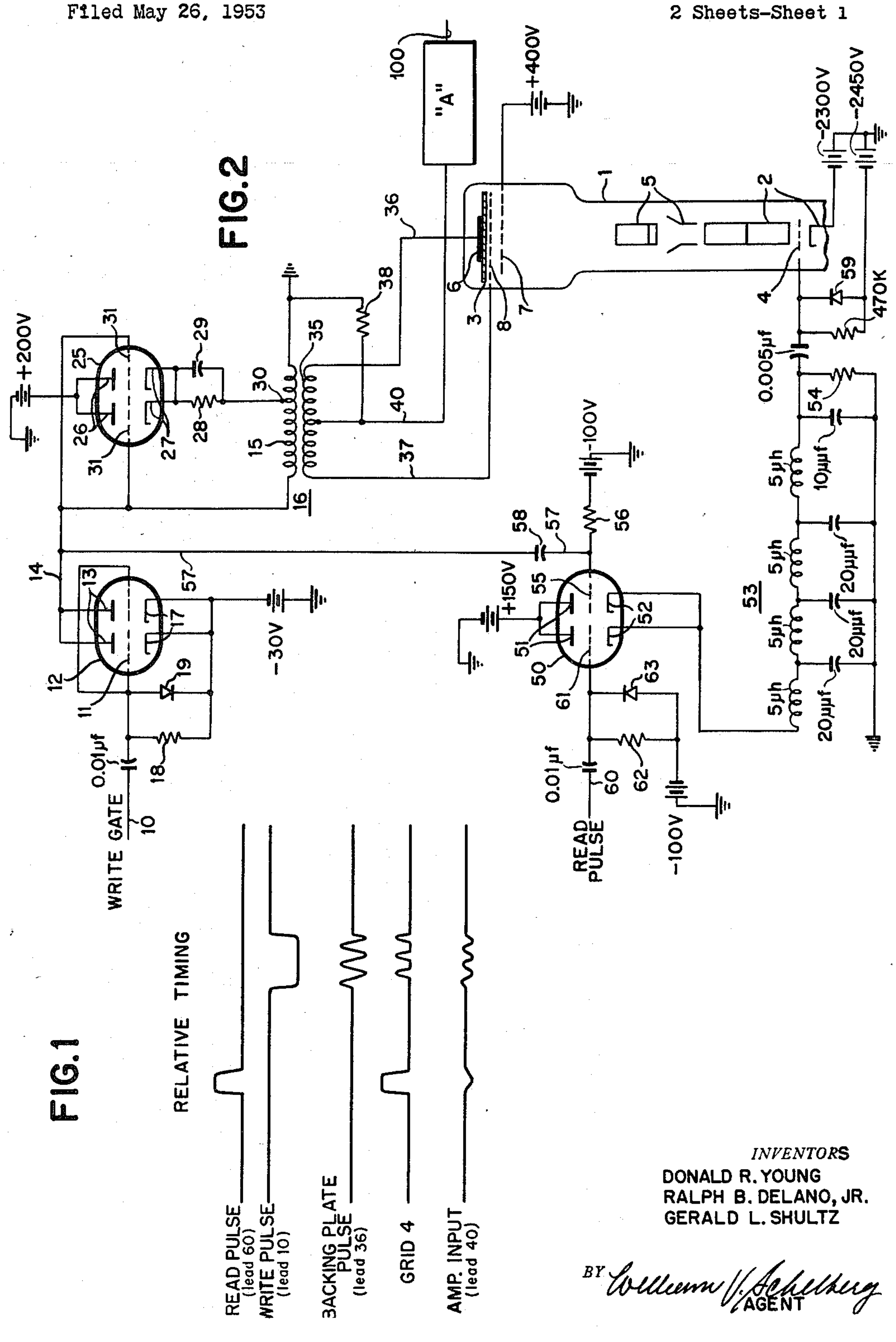

This invention relates to an electrostatic memory system in which binary information is stored in the form of charges established on the dielectric target surface of a barrier grid storage tube. In particular, this invention is directed to a novel method of memory tube operation and to a system whereby this method may be employed.

The principle of electrostatic storage involves setting up one of two reliably distinguishable charge states at discrete regions on the insulating target surface of a cathode ray type storage tube under the influence of a cathode beam directed thereon and, at a later time, in determining which of the two charge states was established in each region.

In establishing a charge on the target surface or writing, the potential applied to a backing plate capacitatively coupled with the dielectric target determines the potential of the target spot bombarded by the cathode beam. For example, if the backing plate is pulsed negatively while the beam is on and the beam turned off before the backing plate modulating pulse is terminated, the bombarded spot will be positive with respect to a collector electrode to which secondary electrons emitted from the spot are attracted. With the backing plate pulsed positively at the time the beam is turned off, the bombarded spot attains a negative charge relative to that of the collector. On the other hand, if the backing plate pulse is terminated before the beam is turned off, or if no backing plate pulse is applied, the spot will remain substantially at an equilibrium potential with respect to the collector electrode.

In the method of reading employed, the backing plate is not pulsed but the target spot is irradiated by the beam and, if a positive charge is present, a read-out pulse of a few millivolts is detected from the backing plate. In order to amplify the small read-out pulse, an amplifier is coupled to the backing plate, however, the interelectrode coupling capacitances of the amplifier tubes become charged by the large backing plate pulse applied during storing or writing and a period of time is required for this charge to be dispelled before the amplifier can respond to the small read-out pulse. This appreciably limits the ability of such a system to read out following a write operation. In accordance with the invention, the cathode beam is modulated at a high frequency during the writing operation and the backing plate is also modulated in proper phase relationship so that it is possible to separate the read-out signal from the backing plate modulation pulse and thus avoid the aforementioned recovery problem in the amplifier.

Accordingly, it is an object of this invention to provide a novel system of memory tube operation whereby the operating cycle time may be substantially reduced.

It is a further object of this invention to provide a storage tube system wherein the output signal taken from the backing plate may be amplified without provision of an appreciable delay period in the cycle of tube operation.

Other objects will be pointed out in the following description and claims and illustrated in the accompanying drawings which disclose, by way of example, the principle of the invention and a contemplated mode of applying the principle.

In the drawings:

Fig. 1 graphically illustrates the waveforms and relative timing of pulses appearing at certain points in the circuit.

Fig. 2 constitutes a circuit diagram of the improved system.

Figure 3:
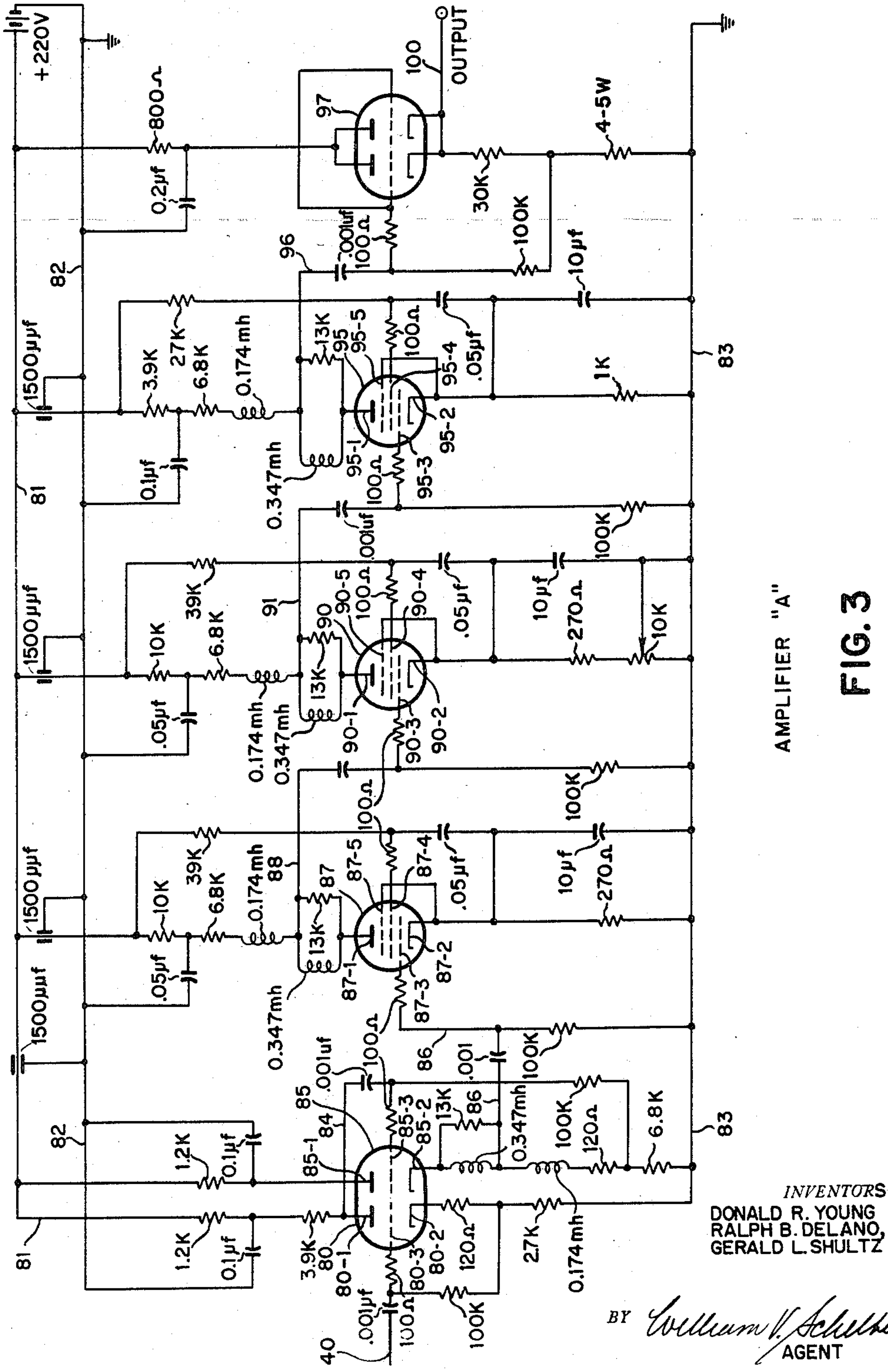

Fig. 3 illustrates in detail the amplifier shown in block form in Fig. 2.

Referring to Fig. 2 of the drawings, a storage delay tube of the barrier grid type is schematically illustrated having an envelope 1 within which is positioned an electron gun 2 provided for forming and focusing an electron beam on a target 3. The beam is turned on under the control of a grid 4 and is directed to particular elemental areas on the target surface by pairs of deflection plate 5. As is well known in the art, these pairs of deflection plates 5 are physically arranged to produce electrostatic fields at right angles to the beam and to one another. It is to be understood that these plates will have varying voltages applied to them from a saw-tooth generator, for example, in order to produce line and frame scanning as in a television raster or staircase type scanning system, however, appropriate voltages may be applied for producing spiral scanning or only single line scanning as may be desired. The means for producing different types of target scanning are well known in the art and, as they are not necessary for an understanding of the invention, need not be further described here.

The target surface 3 may be considered as divided into small elemental regions or spots each of which is capacitatively coupled with a backing plate 6 and comprises an individual elemental condenser in which binary information is stored by the presence or absence of a charge. The backing plate 6 is placed in contact with the target 3 on the side opposite to that upon which the beam impinges and may be formed, for example, by the evaporation of aluminum on the dielectric surface. As the primary beam bombards an elemental target region, secondary electrons are emitted and are attracted to a collector electrode 7 which is positioned between the gun 2 and target 3 and held at a positive voltage of approximately +400 volts. During the bombardment, some of these secondary electrons form a space charge and rain back on the target surface rather than flowing to the collector and, since some of the adjacent regions will be positively charged, there is a tendency to destroy this stored information. A barrier grid 8 is placed on or near the dielectric surface 3 to shield one storage spot from another and to reduce this secondary electron redistribution effect.

The structure of the target assembly for such a memory tube, and the arrangement for mounting the above described elements, is more fully described in the copending application for U. S. Letters Patent, Serial No. 337,544, filed February 18, 1953, now Patent No. 2,795,840.

In storing a positive charge on an elemental target region as in writing a binary "one," the backing plate 6 is pulsed negatively while the beam is turned on by a positive pulse applied to the grid 4. In accordance with the invention, these two controlling pulses are synchronously modulated at high frequency, and the backing plate is connected to an amplifier through the mid point of a coupling transformer secondary 35 so that the high frequency backing plate modulating voltage cancels out and this relatively large voltage does not appear at the input of the amplifier to charge the interelectrode coupling capacitances of the amplifier tubes.

Modulation of the backing plate and beam control grid in synchronism and in phase causes the cathode beam to be turned on during intervals when the backing plate is positive, while modulation of these elements in synchronism but 180° out of phase causes the beam to be turned on during intervals when the backing plate is negative. Either of these methods of operation may be employed since the effect produced is merely a reversal of polarity of the charge established on the elemental target region and the read-out signal obtained therefrom, however, the latter method is employed in the system as described.

In writing a "one," a negative write pulse is selectively applied to a conductor 10 during a predetermined time in the cycle of tube operation (see Fig. 1). The conductor 10 is connected to grid 11 of a double triode tube 12, and plates 13 of the tube are connected through a conductor 14 and primary winding 15 of a coupling transformer 16 to ground. The cathodes 17 are connected to a −30 volt source of potential, and a paralleled resistor 18 and crystal diode 19 connect this negative voltage source to conductor 10, as shown. Tube 12 is normally in a conductive state with current flow following the above described path from ground through the primary winding 15, conductor 14, anodes 13, cathodes 17 and to the −30 volt source. A shielded self resonant oscillator circuit including a double triode tube 25 is connected for control from the winding 15. Plates 26 of tube 25 are connected to a positive source of +200 volts, and cathodes 27 are coupled through a parallel connected resistor 28 and condenser 29 to a tap 30 on the primary winding 15. Grid electrodes 31 are connected to conductor 14 at the upper terminal of winding 15. The double triode tube 12 functions to control the operation of the self resonant oscillator and is selected so as to shunt the grid cathode circuit of the latter with a resistance having a value approximating the critical damping resistance. In the absence of a write gate pulse, tube 12 is normally in a conductive state and the oscillator 25 is quiescent as the impedance across winding 15 of the coupling transformer in parallel with the internal resistance of the tube 12 is at such a value that the tube 25 cannot oscillate. As the aforementioned negative write pulse appears on the conductor 10 and is applied to grid 11, tube 12 cuts off and the oscillator tube 25 conducts through a current path traced from the +200 volt source through tube 25, the paralleled elements 28 and 29 to the tap 30 and through a portion of winding 15 to ground. The current flow through primary winding 15 is thus caused to oscillate at high frequency (15 megacycles) as determined by the relative values of the circuit components and a high frequency voltage is induced in a secondary winding 35 of the coupling transformer 16. One terminal of the secondary winding 35 is connected to the backing plate 6 through a conductor 36 and the other terminal is connected through a conductor 37 to the barrier grid 8. The mid point of the secondary 35 is connected to ground through a resistor 38 and to the amplifier input conductor 40. The high frequency voltage induced in winding 35 is applied in opposed polarity to the backing plate 6 and the barrier grid 8, however, since the conductor 40 is connected to the mid point of the secondary winding, the R. F. pulse at this point substantially cancels out and the voltage applied to conductor 40, and which is available to charge the interelectrode coupling capacitances of the amplifier "A," is of low magnitude. The waveforms of the backing plate pulse, thus applied, and the voltage appearing on conductor 40 are illustrated in Fig. 1.

In order to store a "one," the cathode beam is turned on only when the backing plate pulse is negative as previously described. In accomplishing this function, a double triode tube 50 is provided having plates 51 connected to a positive voltage source of +150 volts and cathodes 52 connected through a delay line 53 and a resistor 54 to ground. This circuit comprises the driving circuit for the storage tube grid 4 and is provided with proper shielding to avoid deleterious effects in the amplifier caused by reception of R. F. radiation from this source as well as from the oscillator 25 which is also shielded as aforementioned. Grid 55, which controls the right half of the tube 50, is connected to a negative potential source of −100 volts through a resistor 56 and also through a conductor 57 and a condenser 58 to the conductor 14 and the upper terminal of the transformer primary winding 15. With tube 12 in a normally conductive state and a steady state current flow through the primary winding 15, the grid 55 is biased negatively by the −100 volt source and the tube 50 is in a nonconductive state. Under this condition, the grid 4 of the memory tube, which is connected to the upper terminal of the resistor 54 through a 0.005 microfarad coupling capacitor, is held at a negative potential and the cathode beam is cut off. Bias voltage for the grid 4 is provided by a circuit connected through a paralleled 470K ohm resistor and a crystal diode 59 to a negative source of −2450 volts which is approximately 150 volts more negative than the potential at which the electron gun cathode is maintained. The diode 59 functions to provide a discharge path for the 0.005 microfarad coupling condenser through the grid bias voltage source and the resistor 54. As oscillations are initiated in winding 15, as described heretofore, the high frequency voltage is applied through the conductor 57 and condenser 58 to the grid 55 so as to cause the right hand section of the tube 50 to conduct at this frequency. As a result, the upper terminal of resistor 54 and grid 4 are subjected to positive voltage excursions retarded in phase by the delay line 53 so as to be applied in the desired timed relationship with the periods of negative modulation of the backing plate 6.

The beam is consequently turned on in synchronism with the negative modulation of the backing plate 6 and a "one" or positive charge is stored in the particular elemental target region to which the beam is directed by the voltages applied to the deflection plates 5.

In reading out this stored information at some later interval, a positive read pulse (Fig. 1) is applied to a conductor 60 at a selected time in the cycle of tube operation. As shown in Fig. 2, the conductor 60 is connected to a grid 61 which controls the left half of the double triode tube 50. The grid 61 is normally biased to a nonconductive state by connection to a −100 volt source through a paralleled resistor 62 and crystal diode 63. As the positive read pulse appears on lead 60, this section of tube 50 conducts and the upper terminal of the pair of resistors 54 and the grid 4 of the memory tube swing to a positive value and the cathode beam is turned on. As the beam strikes the positively charged elemental target region, a negative read-out signal (Fig. 1) is sensed at the backing plate 6 and this negative voltage pulse is applied through conductor 36, the upper half of secondary winding 35 to the amplifier input conductor 40. The unidirectional read-out pulse is substantially unimpeded by this coupling path which appears as resistance and, since the amplifier "A" has not been subjected to a high voltage backing plate pulse, the read-out operation may be timed to follow a write operation within a short interval.

The amplifier unit "A" employed in the system is designed to have less than unity again at the R. F. frequency employed and special care is taken to avoid distortion in the amplifier input stages. The amplifier is shielded in accordance with standard procedures in the art for wide band amplifiers with the entire unit encased within a metallic structure and individual shield members positioned between the several stages. As shown in Fig. 3, the conductor 40 is connected to the amplifier input and is subjected to the voltage modulation waveforms illustrated graphically in Fig. 1. The first input stage comprises a triode tube 80 having a plate 80–1 connected to conducotr 81 through 3.9K and 1.2K resistors. The junction of these resistors is connected to a grounded conductor 82 through a 0.1 microfarad condenser and the latter, in combination with the 1.2K resistor, functions as a filter for a +220 volt plate supply source to which the conductor 81 is coupled. The 3.9K resistor functions as a conventional plate resistor and determines the gain of the amplifier tube 80. Cathode 80–2 of the tube 80 is connected to a grounded lead 83 by a 120 ohm and a 2.7K ohm resistor connected in series and the junction of these resistors is connected to the input conductor 40 through a 100K grid leak resistor as shown. Conductor 40 is connected to grid 80–3 through a 100 ohm current limiting resistor in conventional manner.

The inverted signal from tube 80 is taken from the plate 80–1 and is applied over a lead 84 to the grid 85–3 of a second amplifier stage tube 85. The plate of tube 85 is connected to the 220 volt lead 81 through a resistor capacitor filter circuit such as that employed with tube 80 and the grid circuit is connected to the lead 84 through series connected capacitor and resistor components in conventional manner. The cathode 85–2 is connected to the grounded lead 83 through a network comprising a paralleled 13K resistor and 0.347 millihenry inductance coil in series with a 0.174 millihenry inductance coil, a 120 ohm resistor and a 6.8K resistor. This cathode coupling network constitutes a filter provided to attenuate the 15 megacycle backing plate modulation signals by shunting voltage components at this frequency to ground through the stray capacitances of the circuit and, therefore, functions to provide less than unity gain at this high frequency.

An output lead 86 is connected to the junction of the 0.347 millihenry and 0.174 millihenry inductance coils and to the grid 87–3 of a pentode tube 87 through a 100 ohm resistor with a 100K grid resistor provided between the leak 86 and the grounded conductor 83 in conventional manner. The plate 87–1 is coupled to the plate supply conductor 81 through a network comprising a paralleled 0.347 millihenry inductance coil and a 13K resistor connected in series with a 0.174 millihenry inductance coil, a 6.8K resistor, a 10K resistor and a 1500 micro-microfarad feed through type capacitor. The network comprising the 0.347 millihenry coil, the 0.174 millihenry inductance coil and the 13K resistor constitute an R. F. filter designed to more sharply determine the upper limit of the amplifier band pass range so as to provide less than unity gain in this amplifier stage for the R. F. signal applied to the backing plate. This network which is a modification of the familiar series shunt peaked coupling network also serves to improve the rise time of the signal pulse. The 150 micro-microfarad feed through type capacitor, the 10K resistor and a .05 microfarad capacitor, which is coupled between the junction of the 10K and 6.8K resistors and the grounded lead 82, serve to decouple the plate circuit of the tube 87 from the plate supply conductor 81 and the +220 volt power source. The cathode 87–2 and suppressor grid 87–5 are connected together and to the grounded conductor 83 by a paralleled 10 microfarad condenser and 270 ohm resistor. The screen grid 87–4 is maintained at a positive potential in conventional manner by connection through a 100 ohm resistor and a 39K resistor to the +220 volt line 81 and to a 0.05 microfarad by-pass condenser which is connected between the junction of these two resistors and the cathode 87–2. An output lead 88 is connected to the junction of 0.347 millihenry and 0.174 millihenry inductance coils, comprising the plate circuit filter network, and couples the output of the first pentode stage tube 87 to a succeeeding pentode stage tube 90. An output lead 91 is connected to the plate circuit filter network of tube 90 and couples this stage to a further pentode stage tube 95. The pentode stages 90 and 95 are connected in a similar manner as the first pentode stage, each being provided with the novel plate circuit filter network as described in connection with tube 87. An output lead 96 from the final pentode stage tube 95 is coupled to a cathode follower circuit of conventional design comprising a double triode tube 97. This cathode follower stage provides a high impedance load for the last pentode stage tube 95 while its output impedance is low as desired for coaxial output line loading.

The particular values of the amplifier circuit components as shown in the drawing and mentioned in connection with the above description are given for purposes of illustration and to facilitate an understanding of the arrangement employed and are not intended to be limiting as they may be varied considerably without departing from the principles of the invention. The amplifier circuit functions broadly to reduce the magnitude of the backing plate pulse without reducing the magnitude of the signal before amplification. The frequency selective filter network driven by the cathode follower tube 85 accomplishes this result, however, as the cathode follower introduces some distortion in the signal, the inverter tube 80 is employed to reduce this effect. The unity gain inverter 80 has an appreciable amount of negative feedback and has the additional function of inverting the input signal. The last amplifier stage would be driven into the positive grid region by an envelope component of the R. F. backing plate modulating pulse, however, by inversion of the signal, the R. F. envelope is caused to be negative rather than positive and this condition is avoided.

The read-out signal obtained from the backing plate 6 is negative and appears on conductor 40 as shown in Fig. 1. As this negative pulse is applied through conductor 40 to the grid 80–3 of tube 80, the conductivity of the first amplifier stage tube decreases and the anode 80–1 swings to a more positive voltage value. The output lead 84 connects the anode 80–1 of tube 80 and the control grid 85–3 of the second amplifier stage tube 85 and, as the positive pulse appears on lead 84, tube 85 increases its conductivity. Output lead 86 is connected from the cathode circuit filter network of tube 85 to the grid 87–3 of the first pentode stage tube 87. As tube 85 now conducts at an increased rate, lead 86 is pulsed positively and tube 87 is thereby caused to increase its conductivity. The output lead 88 connects the plate circuit filter network of tube 87 and the control grid 90–3 of the second pentode stage. As pentode 87 increases conductivity, the lead 88 swings to a less positive value and this negative pulse then decreases the conductivity of tube 90. Output lead 91 is connected to the plate circuit network of tube 90 and to the grid 95–3 of the third pentode stage tube 95. As tube 90 decreases its conductivity, a positive voltage pulse appears on lead 91 and is directed to the input of tube 95. This positive pulse increases the conductivity of tube 95 and output lead 96, which is connected to the plate circuit network of tube 95 in a similar manner as in the preceding pentode stages, then is subjected to a negative swing in potential. This negative pulse on lead 96 is applied to the grid of the cathode follower tube 97 and the output from the latter appears as an amplified negative pulse as the conductivity of tube 97 is decreased for the duration of the input pulse applied. An output circuit 100 is connected to the cathode of tube 97 and is coupled to a utilization circuit, not shown. The read-out signal appearing on line 100 may also be employed for control of the tube 12 and oscillator 25 in a regeneration cycle such as that described, for example, in the copending application of D. R. Young and R. B. De Lano, Jr., Serial Number 357,608, filed May 25, 1953.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A cathode ray tube storage system comprising in combination, an electrostatic memory tube having an electron gun, beam control grid, dielectric target and capacitatively coupled backing plate, means for modulating said backing plate including an R. F. oscillator and coupling transformer, means coupling said oscillator and control grid so as to modulate the cathode beam in synchronism with modulation of said backing plate, a signal amplifier circuit and means connecting said signal amplifier circuit to said coupling transformer.

2. An electrostatic storage system for a barrier grid type storage tube having an electron gun, beam control grid, collector grid, barrier grid, dielectric target and capacitatively coupled backing plate comprising, in combination, an oscillator, a coupling transformer having a primary winding and a center tapped secondary winding, means connecting said oscillator to said primary winding, means connecting one terminal of said secondary winding to said backing plate and the other terminal of said secondary winding to said barrier grid, an amplifier, means connecting said amplifier to said secondary center tap, a delay line connected to said control grid and means connecting said oscillator to said delay line.

3. A cathode ray tube storage system comprising, in combination, an electrostatic memory tube having an electron gun, beam control grid, dielectric target and capacitatively coupled backing plate, means for modulating said backing plate and said control grid in synchronism, an output circuit coupled to said backing plate and including an amplifier, said amplifier comprising a plurality of amplifier tubes each having an anode, cathode and input electrode, a source of plate voltage, means including an inductance resistance network connecting each of said anodes to said source of plate voltage and adapted to attenuate the modulation signal applied to said backing plate and said amplifier circuit, and an output circuit connecting each of said networks to the input electrode of the succeeding amplifier tube.

4. An amplifier circuit adapted to amplify a signal appearing on the backing plate of a barrier grid storage tube, said backing plate being subjected to an R. F. voltage modulation pulse prior to the appearance of said signal, said amplifier comprising a plurality of amplifier tubes each having an anode, cathode and control electrode, a source of plate voltage, means connecting the anode of a first of said amplifier tubes to said source of plate voltage, resistor means connecting the cathode of said amplifier tube to ground, a circuit connecting the anode of said first tube to the input electrode of a second amplifier tube, means connecting the anode of said second tube to said source of plate supply voltage, means including a resistance inductance network connecting the cathode of said second tube to ground and adapted to attenuate said R. F. backing plate modulation pulse, a circuit connecting said resistance inductance network to the input electrode of a third amplifier tube, a further resistance-inductance network connecting the anode of said third tube to said source of plate voltage and adapted to attenuate said R. F. backing plate modulation pulse and output circuit means coupled to said further resistance inductance network.

5. In a cathode ray tube storage system, an amplifier circuit adapted to amplify a signal of positive polarity appearing on the backing plate of a barrier grid storage tube, said backing plate being subjected to a high frequency modulation voltage pulse prior to the appearance of said signal, said amplifier comprising a unity gain inverter input stage, a cathode follower stage, means coupling said inverter stage to said cathode follower stage, low pass filter network means coupled to be driven from said cathode follower stage and adapted to separate the signal pulse from the high frequency modulation pulse without distortion, a pentode tube amplifier stage driven from said network means, means including a series shunt peaked coupling network connected in the anode-cathode circuit of said pentode stage, and output circuit means connected to said latter network and to the input of a succeeding amplifier stage.

References Cited in the file of this patent

UNITED STATES PATENTS

| | | |
|---|---|---|
| 2,370,399 | Goodale | Feb. 27, 1945 |
| 2,402,058 | Loughren | June 11, 1946 |
| 2,483,410 | Grieg et al. | Oct. 4, 1949 |
| 2,498,561 | Lipkin | Feb. 21, 1950 |
| 2,589,460 | Tuller | Mar. 18, 1952 |
| 2,617,963 | Arditi | Nov. 11, 1952 |
| 2,642,550 | Williams | June 16, 1953 |
| 2,716,188 | Pensak | Aug. 23, 1955 |
| 2,767,345 | Hansen | Oct. 16, 1956 |
| 2,810,857 | Williams | Oct. 22, 1957 |